United States Patent
Saito

(10) Patent No.: US 8,509,590 B2
(45) Date of Patent: Aug. 13, 2013

(54) METADATA RECORDING DEVICE AND METHOD THEREOF

(75) Inventor: Hiroshi Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 660 days.

(21) Appl. No.: 12/304,815

(22) PCT Filed: May 26, 2008

(86) PCT No.: PCT/JP2008/001306
§ 371 (c)(1),
(2), (4) Date: Dec. 15, 2008

(87) PCT Pub. No.: WO2008/146483
PCT Pub. Date: Dec. 4, 2008

(65) Prior Publication Data
US 2009/0279841 A1    Nov. 12, 2009

(30) Foreign Application Priority Data
May 28, 2007    (JP) ................................ 2007-141065

(51) Int. Cl.
*H04N 5/935* (2006.01)

(52) U.S. Cl.
USPC ......................................................... 386/211

(58) Field of Classification Search
USPC ......................................................... 386/211
See application file for complete search history.

(56) References Cited

U.S. PATENT DOCUMENTS

| | | | |
|---|---|---|---|
| 5,897,661 A * | 4/1999 | Baranovsky et al. | ......... 711/170 |
| 6,438,317 B1 | 8/2002 | Imahashi et al. | |
| 6,556,627 B2 | 4/2003 | Kitamura et al. | |
| 6,594,439 B2 | 7/2003 | Imahashi et al. | |
| 6,970,514 B1 | 11/2005 | Nagumo et al. | |
| 7,126,993 B2 | 10/2006 | Kitamura et al. | |
| 7,209,636 B2 | 4/2007 | Imahashi et al. | |

(Continued)

FOREIGN PATENT DOCUMENTS

| | | |
|---|---|---|
| EP | 1 111 932 | 6/2001 |
| EP | 1 753 244 | 2/2007 |

(Continued)

OTHER PUBLICATIONS

International Search Report issued Jul. 1, 2008 in the International (PCT) Application of which the present application is the U.S. National Stage.

(Continued)

*Primary Examiner* — Thai Tran
*Assistant Examiner* — Jose Mesa
(74) *Attorney, Agent, or Firm* — Wenderoth, Lind & Ponack, L.L.P.

(57) ABSTRACT

A metadata recording device that inserts an invalid byte for anti-emulation without scanning the contents of metadata and allows a data length after the anti-emulation is performed to be a fixed length is a metadata recording device that records main data and metadata, which are binary data, and includes: a generation unit configured to generate pieces of invalid data, each of which is data of a value not included in a specific byte sequence that is a byte sequence having a specific meaning; an insertion unit configured to insert each piece of the invalid data into the metadata at intervals shorter than a length of the specific byte sequence; and a recording unit configured to record the metadata into which the pieces of the invalid data are inserted.

12 Claims, 14 Drawing Sheets

(56) References Cited

U.S. PATENT DOCUMENTS

| | | |
|---|---|---|
| 7,505,485 B2 | 3/2009 | Sullivan et al. |
| 7,839,895 B2 | 11/2010 | Sullivan et al. |
| 8,170,118 B2 | 5/2012 | Kitamura et al. |
| 2001/0001023 A1 | 5/2001 | Imahashi et al. |
| 2001/0048803 A1 | 12/2001 | Imahashi et al. |
| 2002/0059643 A1 | 5/2002 | Kitamura et al. |
| 2003/0128292 A1 | 7/2003 | Kitamura et al. |
| 2003/0146855 A1 | 8/2003 | Sullivan et al. |
| 2003/0215215 A1 | 11/2003 | Imahashi et al. |
| 2004/0267698 A1* | 12/2004 | Shinkai et al. .................. 707/1 |
| 2005/0007623 A1 | 1/2005 | Sakamoto et al. |
| 2005/0076039 A1 | 4/2005 | Ludwig et al. |
| 2005/0259875 A1 | 11/2005 | Imura et al. |
| 2005/0265449 A1 | 12/2005 | Yoon |
| 2006/0291570 A1 | 12/2006 | Kitamura et al. |
| 2007/0076798 A1 | 4/2007 | Imahashi et al. |
| 2009/0168805 A1 | 7/2009 | Sullivan et al. |
| 2010/0278272 A1* | 11/2010 | Gordon .................. 375/240.23 |
| 2010/0284667 A1 | 11/2010 | Yahata et al. |

FOREIGN PATENT DOCUMENTS

| | | |
|---|---|---|
| JP | 2000-032394 | 1/2000 |
| JP | 2001-127726 | 5/2001 |
| JP | 2001-169292 | 6/2001 |
| JP | 2005-018904 | 1/2005 |
| JP | 2005-341567 | 12/2005 |
| JP | 2006-502605 | 1/2009 |
| WO | 99/16196 | 4/1999 |
| WO | 03/015415 | 2/2003 |
| WO | 03/063499 | 7/2003 |
| WO | 2007/013378 | 2/2007 |

OTHER PUBLICATIONS

Masato Nonaka et al., "PHS Real Time Dogazo Tsushin System", Oki Denki Kenkyu Kaihatsu, Nov. 1, 1998, vol. 65, No. 3, pp. 171-174.

Extended European Search Report issued Aug. 28, 2012 in corresponding European Patent Application No. 08763906.8.

* cited by examiner

METADATA RECORDING DEVICE AND METHOD THEREOF

TECHNICAL FIELD

The present invention relates to a metadata recording device that records metadata by inserting additional metadata into binary data such as video and audio, and a method thereof.

BACKGROUND ART

Along with progress of digital technology, the number of devices that record videos and audios in file as digital data has been increasing. The major feature of the digital technology is that all kinds of information can be processed in a standardized manner by handling them as digital data. With the digital technology, videos, audios, and letters can be handled as one file. For example, although, in the case where a caption is put to a video, the video in which letters are included in advance is conventionally recorded and transmitted, in recent years video data and caption data have been multiplexed independently, and then recorded and transmitted, thereby allowing a caption to be switched between ON and OFF at the time of reproduction. As with the caption data corresponding to the video data, auxiliary data that is recorded and transmitted in addition to principal data (main data) is called metadata. The use of metadata is thought to dramatically develop future digital apparatuses.

As with the above-mentioned example, in the case where video data is multiplexed with caption data and the video data multiplexed with the caption data is recorded and transmitted, it is necessary to recognize segments of data to separate the video data and the caption data at the time of reproduction. In the case where both the video data and the caption data are binary data, it is not possible to distinguish a boundary between the video data and the caption data by only observing a data value. When the binary data is in an 8-bit format, the binary data can be a value having 256 steps ranging from 0 to 255 in the decimal number. In the case where there is a value that is prohibited for common use in the video data and the caption data, prohibited data can be used as an identifier for the segments of data. However, because every value ranging from 0 to 255 exists in compressed video data, the prohibited data cannot be used as the identifier for the segments of data.

Consequently, giving a meaning of the identifier to a specific byte sequence generated by combining successive plural data has been attempted. For instance, in MPEG-2 according to Non-patent Reference 1, a specific meaning is given to four bytes of 0x000001 ( represents specific one byte), and the 0x000001 is a start code indicating a start of a sequence, a GOP, a picture, a slice. Further, a false start code is not generated by elaborately designing a table for variable length code to prevent a pattern of the above-mentioned 0x000001 from occurring in the compressed data. However, even when the specific byte sequence 0x000001** having four bytes does not occur in the variable-length-coded data stipulated by the standard, in the case where a data sequence identical to the start code is included in given metadata to be multiplexed, the start code is falsely detected to prevent normal decoding. Thus, in the MPEG-2, a data sequence 0x000001 is prohibited to be in user data.

Prohibiting the specific byte sequence in data to be multiplexed degrades the degree of freedom of metadata. Consequently, in the H.264 standard according to Non-patent Reference 2, in the case where any of 0x000000, 0x000001, 0x000002, or 0x000003 occurs in valid compressed data, inserting an invalid byte 0x03 for anti-start code emulation after 0x0000 to multiplex the data has been stipulated. At the time of reproduction, the 0x03 following the 0x0000 is deleted and then the 0x0000 is decoded. Accordingly, it becomes possible to accurately multiplex the metadata including the byte sequence identical to the start code (Patent Reference 1).

Non-patent Reference 1: ISO/IEC 13818-2 Information technology—Generic coding of moving pictures and associated audio information: Video Non-patent Reference 2: ITU-T H.264 Infrastructure of audiovisual services—Coding of moving video: Advanced video coding for generic audiovisual services Patent Reference 1: Japanese Unexamined Patent Application Publication No. 2000-32394

SUMMARY OF THE INVENTION

Problems that Invention is to Solve

However, anti-start code emulation measures in the H.264 standard cause the following two problems. The first problem is that a process for inserting an invalid byte for anti-start code emulation which depends on the contents of metadata is complicated. In other words, after scanning in order the contents of the metadata from a start of the metadata and checking whether or not there is a byte sequence that is falsely recognized as a start code, in the case where there is the byte sequence that is falsely recognized as the start code, the process for inserting the invalid byte 0x03 is needed. The second problem is that because inserting how many bytes is not determined without determining how many byte sequences identical to a start code are included in the contents of the metadata, a data length of the metadata varies. That is to say, even when a length of original metadata is always the same, because how the invalid byte is inserted depends on the contents of the metadata, a data length after the emulation measures are performed is nonconstant. Thus, in the case where only metadata that is interleaved for every one picture of a H.264 byte stream is rewritten, a length of the metadata to be rewritten may be longer than a length of the recorded metadata, and the recorded metadata cannot be rewritten by updating.

For instance, even in the case where a tiny part in metadata is altered, it is necessary to judge whether or not the process for inserting the invalid byte for anti-start code emulation is needed by scanning the contents of the metadata. In addition, in the case where the process is judged necessary, it is necessary to rewrite all of the metadata following the position at which the invalid byte is inserted.

The present invention has been conceived to solve the above-mentioned problems, and has an objective of providing a metadata recording device which can insert an invalid byte for anti-emulation without scanning the contents of metadata and allow a data length after the anti-emulation is performed to be a fixed length.

Means to Solve the Problems

In order to achieve the above objective, the metadata recording device according to the present invention is a metadata recording device that records main data and metadata, which are binary data, and includes: a generation unit configured to generate pieces of invalid data, each of which is data of a value not included in a specific byte sequence that is a byte sequence having a specific meaning; an insertion unit configured to insert each piece of the invalid data into the metadata at intervals shorter than a length of the specific byte sequence; and a recording unit configured to record the metadata into which the pieces of the invalid data are inserted.

With this, inserting the invalid data into the metadata at the intervals shorter than the length of the specific byte sequence allows an invalid byte for anti-emulation to be inserted without scanning the contents of the metadata and a data length after the anti-emulation is performed to be a fixed length.

Here, in the case where the binary data is compressed data in compliance with the H.264 standard, where the specific byte sequence is a byte sequence 0x000000, 0x000001, 0x000002, or 0x000003 that has three bytes and represents a start code in the H.264 standard, and where supplemental enhancement information (SEI) in the H.264 standard is multiplexed with the metadata, the generation unit may generate the pieces of the invalid data having one byte, and the insertion unit may insert, into the metadata, each piece of the invalid data having one byte for every two bytes in the metadata.

With this, even in the case where the SEI in the H.264 standard is multiplexed with the metadata, the invalid byte for anti-emulation can be inserted without scanning the contents of the metadata, and the data length after the anti-emulation is performed can be the fixed length.

Furthermore, in the case where the metadata is a digital video (DV) pack having five bytes in a DV format, the generation may generate the pieces of the invalid data, and the insertion unit may insert one of the pieces of the invalid data having one byte after start one byte, and insert another piece of the invalid data having one byte after former two bytes and latter two bytes of pack data having four bytes, respectively, the start one byte representing a pack header of the DV pack, the pack data following the pack header.

With this, even in the case where the DV pack is multiplexed with a H.264 byte stream, the invalid byte for anti-emulation can be inserted without scanning the contents of the metadata, and the data length after the anti-emulation is performed can be the fixed length.

Moreover, the metadata recording device may include an update unit configured, in the case where the DV pack indicates time code information, to update the time code information without decoding the binary data by using a fixed position of the time code information in the binary data.

As a result, because it becomes easy to multiplex the binary data with given metadata and the binary data multiplexed with the metadata is not decoded mistakenly, an application range of recording and transmitting metadata is expected to expand.

In addition, the metadata recording device may further include a reading unit configured to read the recorded metadata, and a discarding unit configured to discard the pieces of the invalid data in the read metadata.

With this, discarding the pieces of the invalid data in the metadata allows the metadata to be used at the side of reading the metadata.

It is to be noted that the present invention can be realized not only as the above-mentioned metadata recording device but also as a metadata recording method having characteristic units included by the metadata recording device as steps and as a program causing a computer to execute the steps. It is needless to say that such a program can be distributed via recording media such as a CD-ROM and transmission media such as the Internet.

Effects of the Invention

As is obvious from the above description, according to the present invention, inserting each piece of the invalid data into the metadata at the intervals shorter than the length of the specific byte sequence allows the invalid byte for anti-emulation to be inserted without scanning the contents of the metadata and the data length after the anti-emulation is performed (after the conversion) to be the fixed length.

In this manner, when the data length after the conversion is the fixed length, even in the case of rewriting the metadata, it becomes possible to update only data at fixed positions without accurately performing a decoding process on data from the start. As a result, because it becomes easy to multiplex binary data with given metadata and the multiplexed binary data is not decoded mistakenly, an application range of recording and transmitting metadata is expected to expand. In particular, in the case where metadata is a DV pack in a DV format, it is possible to separately extract a pack header indicating a category of the DV pack, and it becomes easy to rewrite only pack data that is a content of the DV pack.

NUMERICAL REFERENCES

Figure 1:
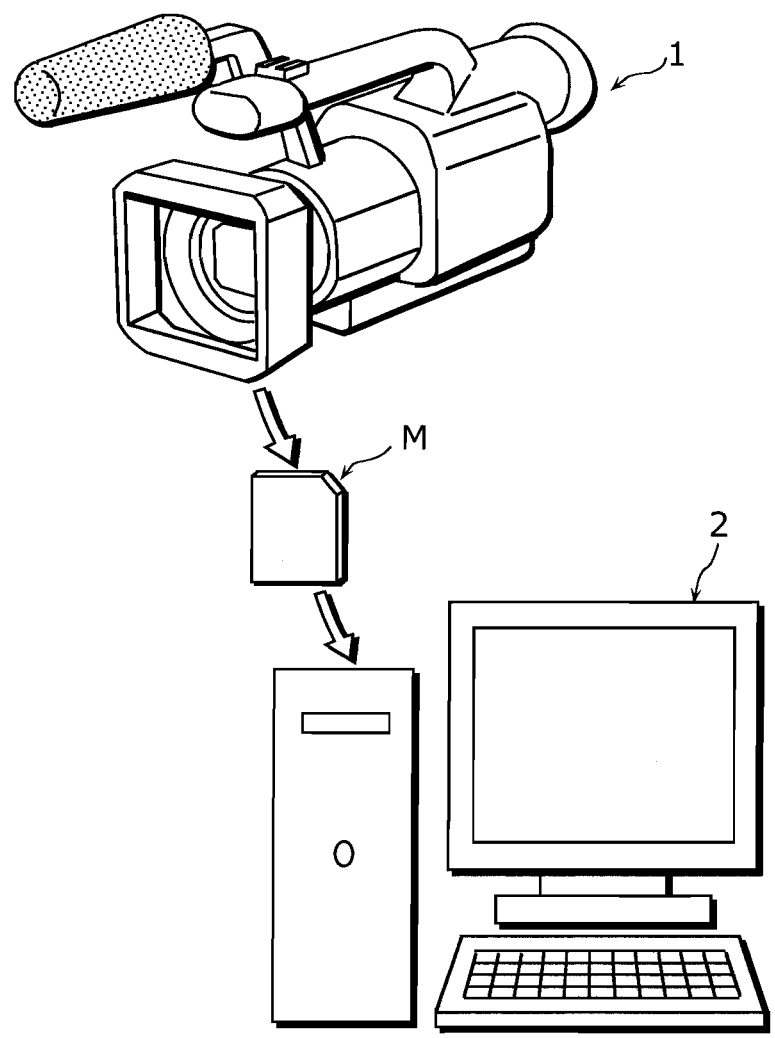
FIG. 1 is a diagram illustrating a situation in which the present invention is put to practical use.

10 Metadata recording device
11 Generation unit
12 Insertion unit
13, 34 Recording unit
14 Discarding unit
15, 32 Reading unit
16 Recording memory I/F unit
17 Update unit
20, 30 Metadata editing device
21 Judging unit
23, 33 Editing unit
M Recording memory

DETAILED DESCRIPTION OF THE INVENTION

The following will describe embodiments of the present invention with reference to the drawings.

(Embodiment 1)

FIG. 1 is a diagram illustrating a situation in which the present invention is put to practical use.

Here, a camera recorder 1 which records video signals and audio signals is exemplified. A recording memory M is removable from the camera recorder 1. The camera recorder 1 can record in file the video signals and the like in the recording memory M. An editing device 2 such as a personal computer can edit the files generated by the camera recorder 1 via the recording memory M.

The following will assume and describe a case in which supplemental enhancement information (SEI) in the H.264 standard is multiplexed with metadata. That is to say, binary data to be mentioned below is compressed data in compliance with the H.264 standard. Furthermore, a specific byte sequence is a byte sequence 0x000000, 0x000001, 0x000002, or 0x000003 that has three bytes and denotes a start code in the H.264 standard.

Figure 2:
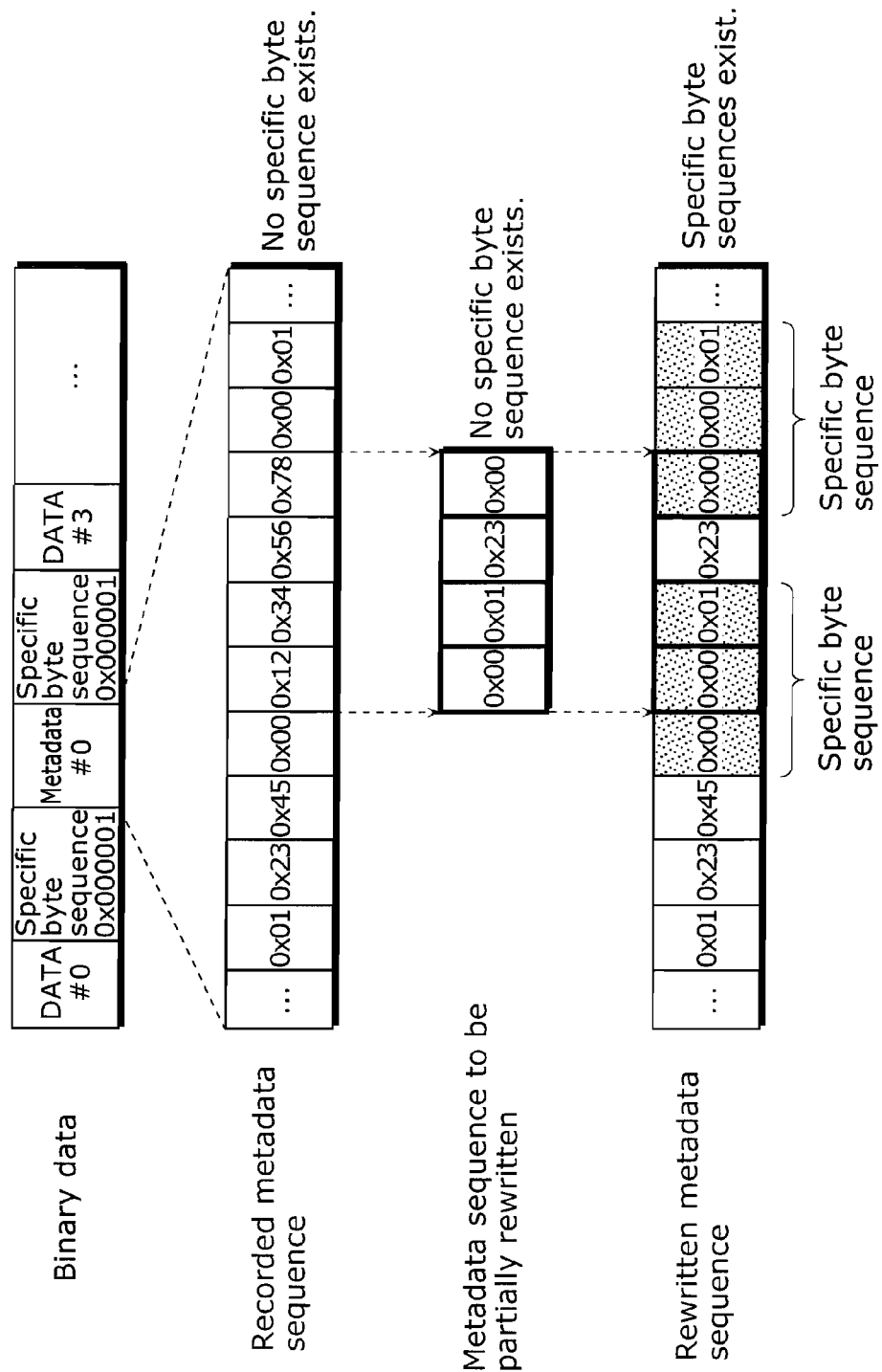
FIG. 2 is a diagram for illustrating a problem when inserting metadata.

FIG. 2 is a diagram for illustrating a problem when inserting metadata.

Here, a case in which a specific byte sequence indicating a partition in binary data is 0x000001 having three bytes is exemplified. In the case where a value is updated by inserting given metadata into the binary data, even though the specific byte sequence is not included in both recorded metadata and a to-be-rewritten part of the metadata, the partition in the binary data can be falsely recognized from the metadata in which a boundary of the part of the metadata is changed, depending on boundary conditions. In general, different devices (e.g. the editing device 2) rewrite metadata partially, and there are many cases in which it cannot be interpreted as to what previous data and following data represent. Accordingly, parts other than the part of the metadata to be rewritten cannot be changed at discretion. In that case, it becomes impossible to rewrite the metadata. In response, the embodiment 1 of the present invention employs a metadata recording method that is to be described below.

Figure 3:
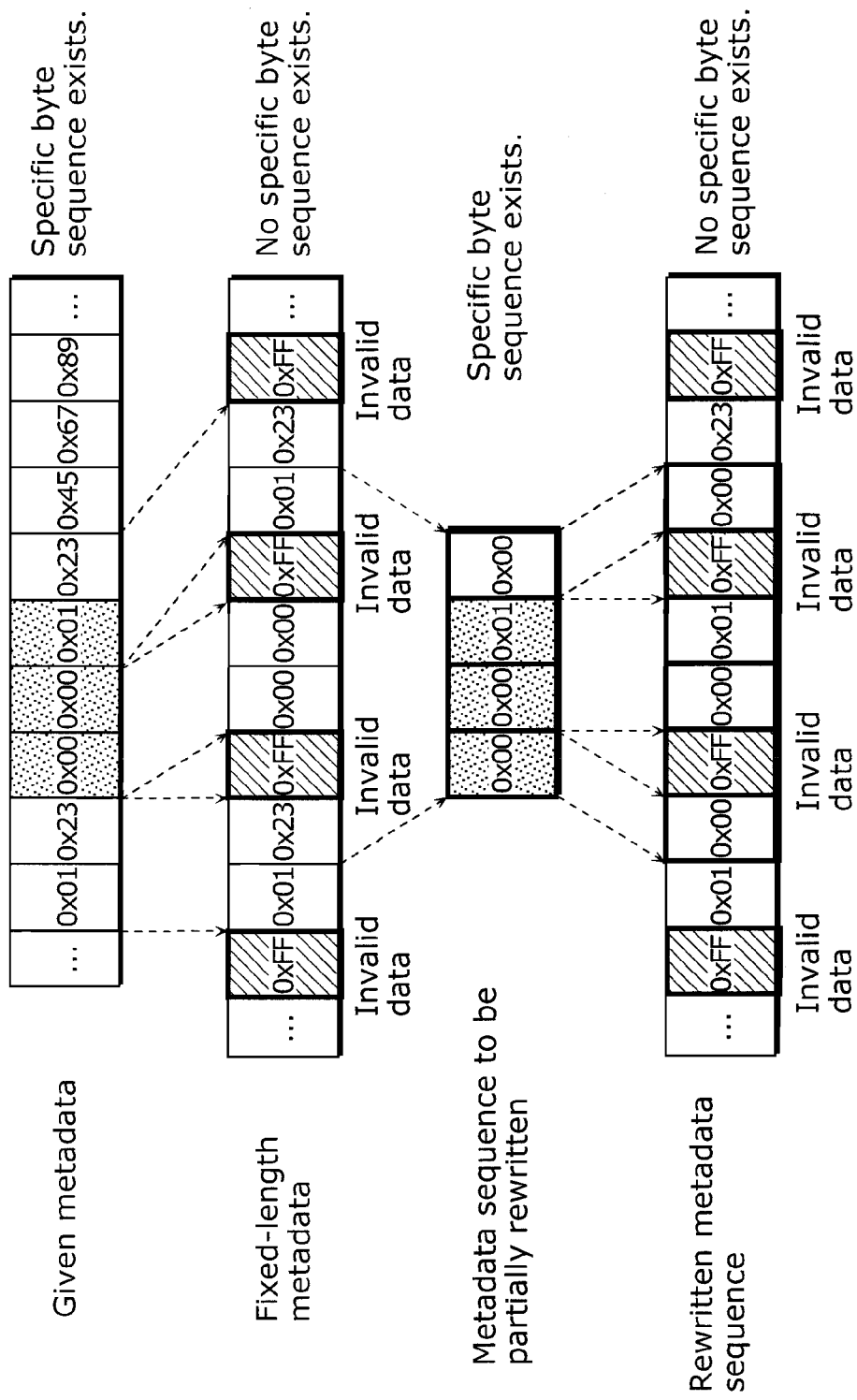
FIG. 3 is a diagram illustrating a metadata recording method according to an embodiment 1.

FIG. 3 is a diagram illustrating a metadata recording method according to the embodiment 1.

As illustrated in the figure, the metadata recording method according to the embodiment 1 is characterized by inserting each of pieces of invalid data into metadata at intervals to change the metadata, so that the metadata does not include a specific byte sequence, the insertion causing the metadata to be data having a fixed length, the intervals being shorter than a length of the specific byte sequence indicating a segment of binary data. For instance, because the specific byte sequence in the embodiment 1 is 0x000001 having three bytes, invalid data 0xFF is inserted for every two bytes. When the 0xFF is inserted for every two bytes in this manner, even though given metadata includes the specific byte sequence 0x000001, the specific byte sequence 0x000001 is not generated at a rewritten boundary. Consequently, rewriting the metadata does not cause the false recognition of the partition in the binary data to occur, and it becomes possible to always decode the binary data accurately.

The following will describe the present invention in detail.

Figure 4:
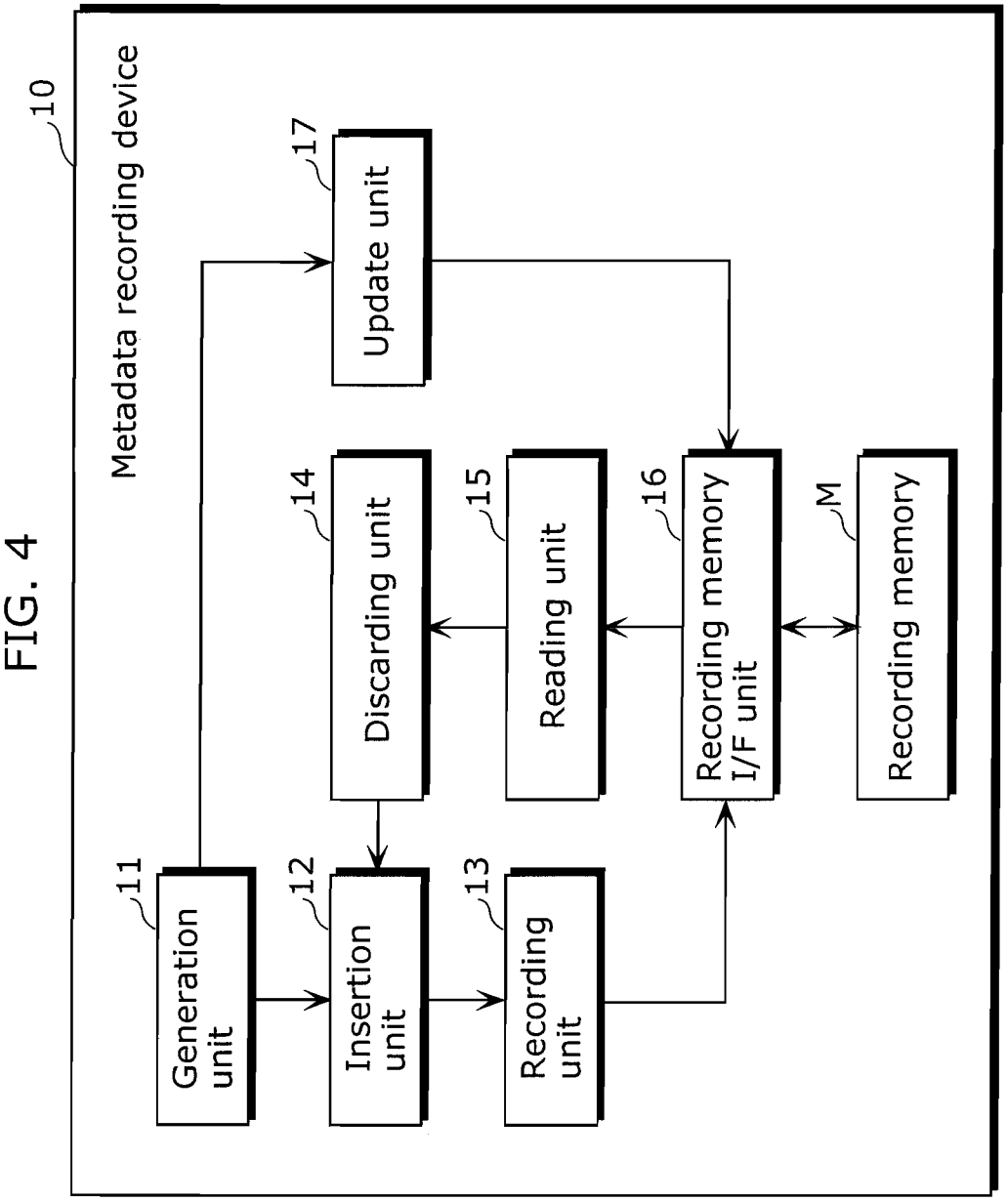
FIG. 4 is a schematic functional block diagram of a metadata recording device according to the present invention.

FIG. 4 is a schematic functional block diagram of a metadata recording device 10 according to the present invention.

As illustrated in the figure, the metadata recording device 10 according to the present invention includes a generation unit 11, an insertion unit 12, a recording unit 13, a discarding unit 14, a reading unit 15, a recording memory I/F unit 16, an update unit 17, and a recording memory M. The generation unit 11 is an example of a generation unit according to the present invention, and generates pieces of invalid data, each of which is data of a value not included in a specific byte sequence which is a byte sequence having a special meaning. The method for generating the invalid data is not limited to this. One aspect of generating the invalid data is that the invalid data is stored in advance, and the stored invalid data is read for use. The insertion unit 12 is an example of an insertion unit according to the present invention, and inserts the invalid data between metadata at intervals shorter than a length of the specific byte sequence. The recording unit 13 is an example of a recording unit according to the present invention, and records the metadata into which the pieces of invalid data are inserted in the recording memory M via the recording memory I/F unit 16. When the recording memory M is inserted to a card slot of the metadata recording device 10, the recording memory M is connected to the recording memory I/F unit 16. The reading unit 15 is an example of a reading unit according to the present invention, and reads the metadata recorded in the recording memory M via the recording memory I/F unit 16. The discarding unit 14 is a discarding unit according to the present invention, and discards the pieces of invalid data in the metadata read by the reading unit 15. The update unit 17 is an example of an update unit according to the present invention, and updates the metadata recorded in the recording memory M without decoding binary data. It is to be noted that the term "update" is synonymous with the term "rewrite".

Here, the camera recorder 1 and the editing device 2 are an example of the metadata recording device 10 according to the present invention. The camcorder 1, however, may have a function to insert pieces of invalid data into metadata, and may not necessarily include the update unit 17 and the like. In addition, the editing device 2 may have a function to update metadata, and may not necessarily include, for instance, the generation unit 11 and the insertion unit 12. Though not illustrated in the figure, it goes without saying that the metadata recording device 10 may include a reception unit for receiving an instruction from a user, an encoding unit for encoding data, and further a decoding unit for decoding the encoded data.

Figure 5:
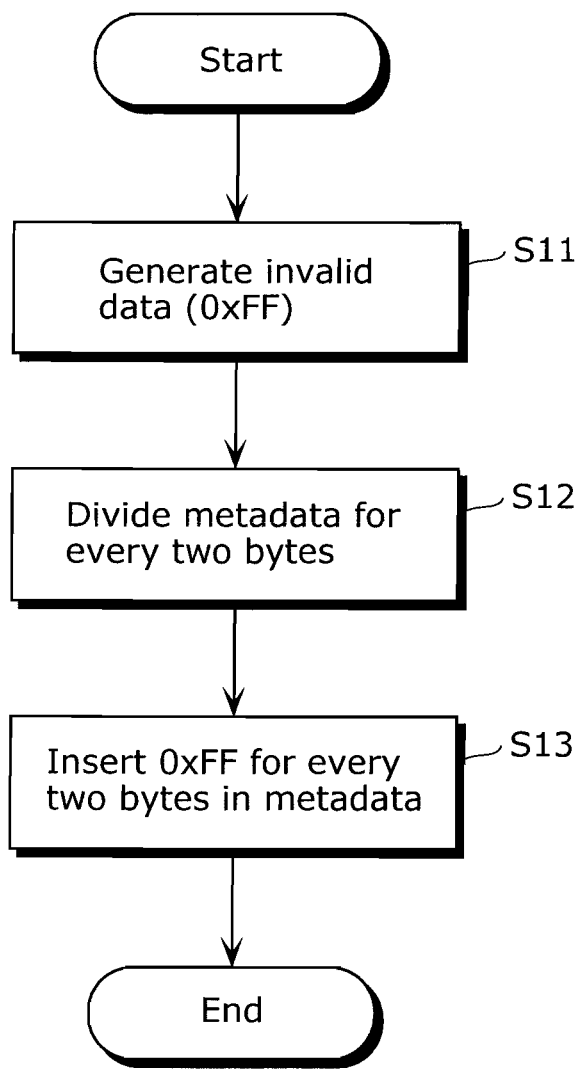
FIG. 5 is a diagram illustrating a procedure for recording metadata in the embodiment 1.

FIG. 5 is a diagram illustrating a procedure for recording metadata in the embodiment 1.

First, the generation unit 11 generates invalid data 0xFF (S11), and transmits the generated 0xFF to the insertion unit 12. The insertion unit 12 divides metadata for every two bytes (S12), and inserts the 0xFF into the metadata for every two bytes in the metadata (S13).

As described above, according to the embodiment 1, inserting the invalid data into the metadata at the intervals allows invalid data for anti-emulation to be inserted without scanning contents of the metadata and the data length of the metadata after the anti-emulation is performed (after conversion) to be the fixed length, the intervals being shorter than the length of the specific byte sequence. When the data length after the conversion is the fixed length in this manner, it becomes easy to rewrite data partially. For example, even in the case of rewriting metadata, the update unit 17 in the editing device 2 can update only data at fixed positions without accurately performing a decoding process on data from the start. As a result, because it becomes easy to multiplex binary data with given metadata and the binary data multiplexed with the metadata is not decoded mistakenly, an application range of recording and transmitting metadata is expected to expand.

It is to be noted that although the embodiment 1 has exemplified the 0x000001 having three bytes as the specific byte sequence and the 0xFF as the invalid data, the present invention is not limited to this. That is to say, as long as a length of specific byte sequence is fixed, any value may suffice. In addition, the invalid data may be a value not included in the specific byte sequence, and is not limited to the 0xFF.

It is to be noted that though not mentioned above, at the time of reproduction, when the reading unit 15 separates metadata from binary data at the time of reading the metadata from the recording memory M, the discarding unit 14 is designed to discard the invalid data 0xFF in the read metadata.

It is to be noted that although the metadata is divided after the invalid data is generated in FIG. 5 (S11 to S12), the order of the steps S11 and S12 may be reverse.

(Embodiment 2)

An aspect of the editing device 2, which is the example of the metadata recording device 10 according to the present invention, will be described in an embodiment 2.

Figure 6:
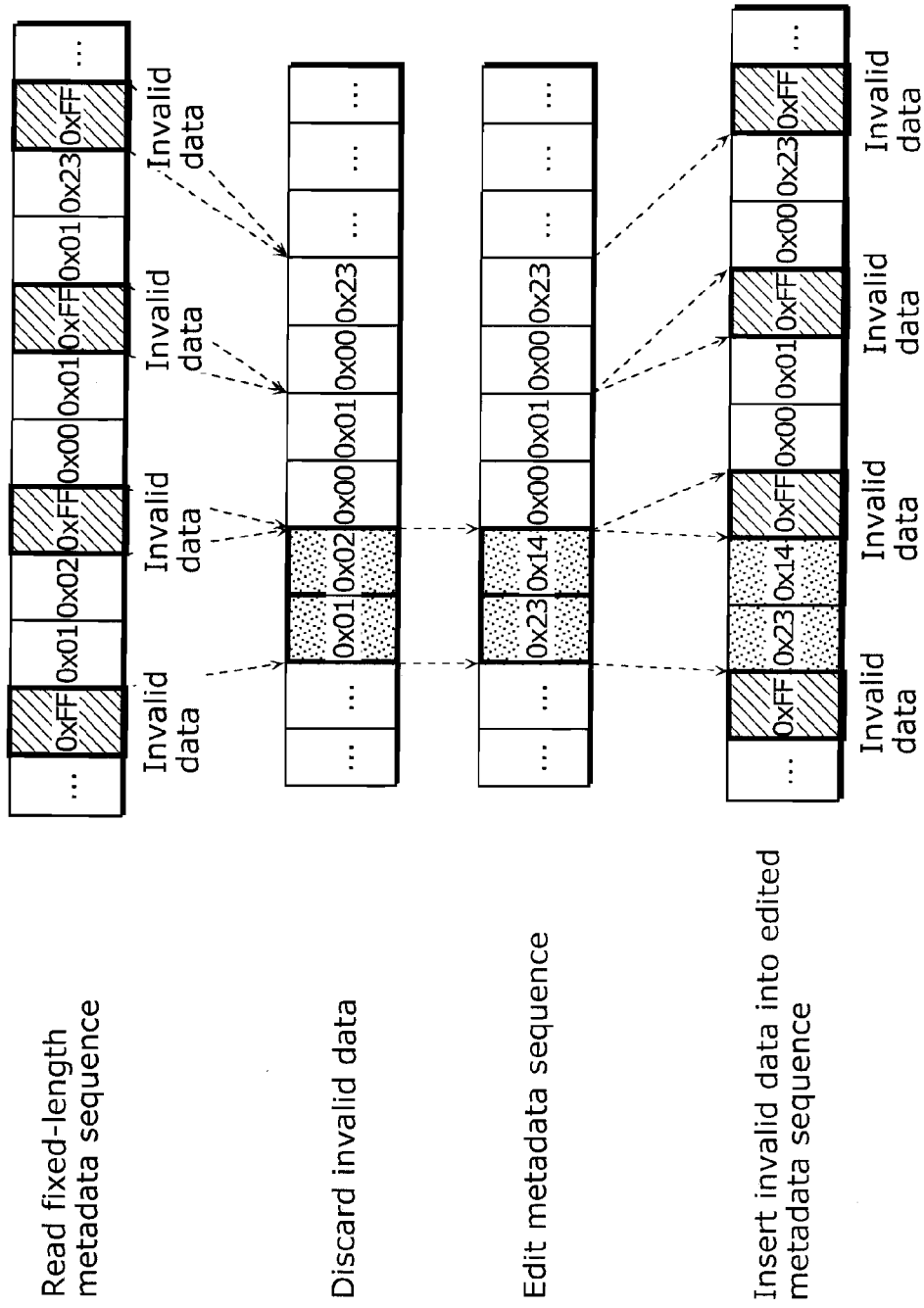
FIG. 6 is a diagram illustrating a metadata editing method according to an embodiment 2.

FIG. 6 is a diagram illustrating a metadata editing method according to the embodiment 2.

As illustrated in the figure, the metadata editing method according to the embodiment 2 is characterized by editing metadata into which each of pieces of invalid data is inserted at intervals to change the metadata, so that the metadata does not include a specific byte sequence, the insertion causing the metadata to be data having a fixed length, the intervals being shorter than a length of the specific byte sequence indicating a segment of binary data. For instance, after all of the metadata sequences each of which is data having a fixed length (hereinafter, referred to as fixed-length metadata sequence) are read, pieces of invalid data included in the fixed-length metadata sequences are discarded once. Such metadata sequences, which are the original metadata, are then edited, and the discarded pieces of invalid data are inserted into the edited metadata sequences again. In this manner, because the metadata sequences each are caused to be the data having the fixed length again after the editing, the false recognition of the partition in the binary data caused by rewriting the metadata does not occur, and it becomes possible to always decode the binary data accurately.

The following will describe the present invention in detail.

Figure 7:
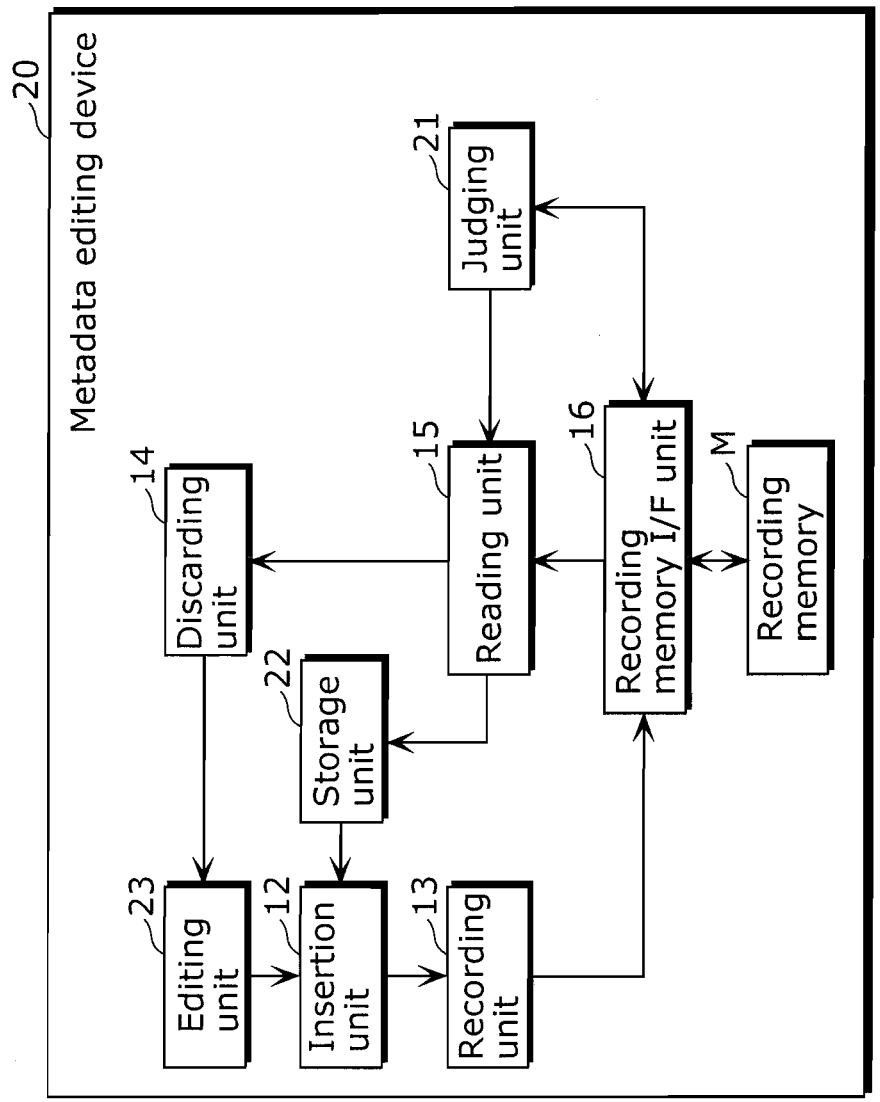
FIG. 7 is a schematic functional block diagram of a metadata editing device according to the present invention.

FIG. 7 is a schematic functional block diagram of a metadata editing device 20 according to the present invention.

As illustrated in the figure, the metadata editing device 20 includes the insertion unit 12, the recording unit 13, the discarding unit 14, the reading unit 15, the recording memory I/F unit 16, a judging unit 21, a storage unit 22, an editing unit 23, and the recording memory M. It is to be noted that identical elements are represented by the same reference numerals as in FIG. 4, the detailed description of the elements is omitted. In contrast to the metadata recording device 10 according to the embodiment 1, the metadata editing device 20 shown in FIG. 7 differs in that the generation unit 11 and the update unit 17 are removed, and the judging unit 21, the storage unit 22, and the editing unit 23 are added. The judging unit 21 judges whether or not metadata to be edited is fixed-length data that is metadata into which each of pieces of invalid data is inserted at intervals shorter than a length of a specific byte sequence indicating a partition in binary data. The editing unit 23 edits the metadata from which the pieces of invalid data are discarded by the discarding unit 14.

As stated above, the metadata editing device 20 shown in FIG. 7 is one aspect of the metadata recording device 10 having a function to edit metadata that is fixed-length data that is the metadata into which the pieces of invalid data are inserted.

Figure 8:
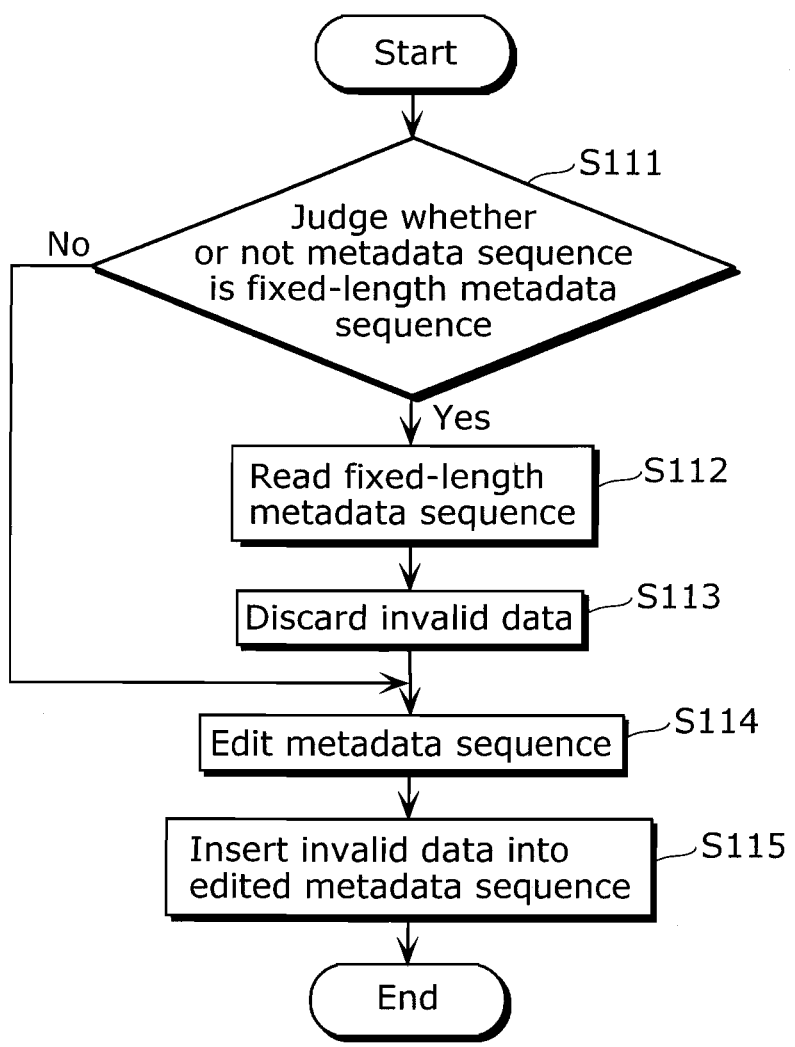
FIG. 8 is a diagram illustrating a procedure for editing metadata according to the embodiment 2.

FIG. 8 is a diagram illustrating a procedure for editing metadata according to the embodiment 2.

First, the judging unit 21 judges whether or not metadata to be edited is a fixed-length metadata sequence (S111). In the case where the metadata to be edited is the fixed-length metadata sequence (Yes in S111), the reading unit 15 reads the entire fixed-length metadata sequence (S112), and transmits the read fixed-length metadata sequence to the discarding unit 14. Here, the reading unit 15 stores pieces of invalid data in the storage unit 22. Next, the discarding unit 14 discards the pieces of invalid data from the read fixed-length metadata sequence (S113). Then, the editing unit 23 edits the metadata sequence from which the pieces of invalid data are discarded (S114), and transmits the edited metadata sequence to the insertion unit 12. Subsequently, the insertion unit 12 obtains the pieces of invalid data stored in the storage unit 22, and inserts the pieces of invalid data into the edited metadata sequence (S115). Here, for instance, in the same way the procedure for recording metadata has been explained, a metadata sequence is divided for every two bytes, and 0xFF is inserted into the metadata sequence for every two bytes in the metadata sequence.

As described above, according to the embodiment 2, because, no matter how many times the editing is performed, the metadata sequence is the fixed-length data again after the editing and anti-emulation measures are taken, the false recognition of the segments of the binary data caused by rewriting the metadata does not occur, and it becomes possible to always decode the binary data accurately.

(Embodiment 3)

Another aspect of the editing device 2, which is the example of the metadata recording device 10 according to the present invention, will be described in an embodiment 3.

Figure 9:
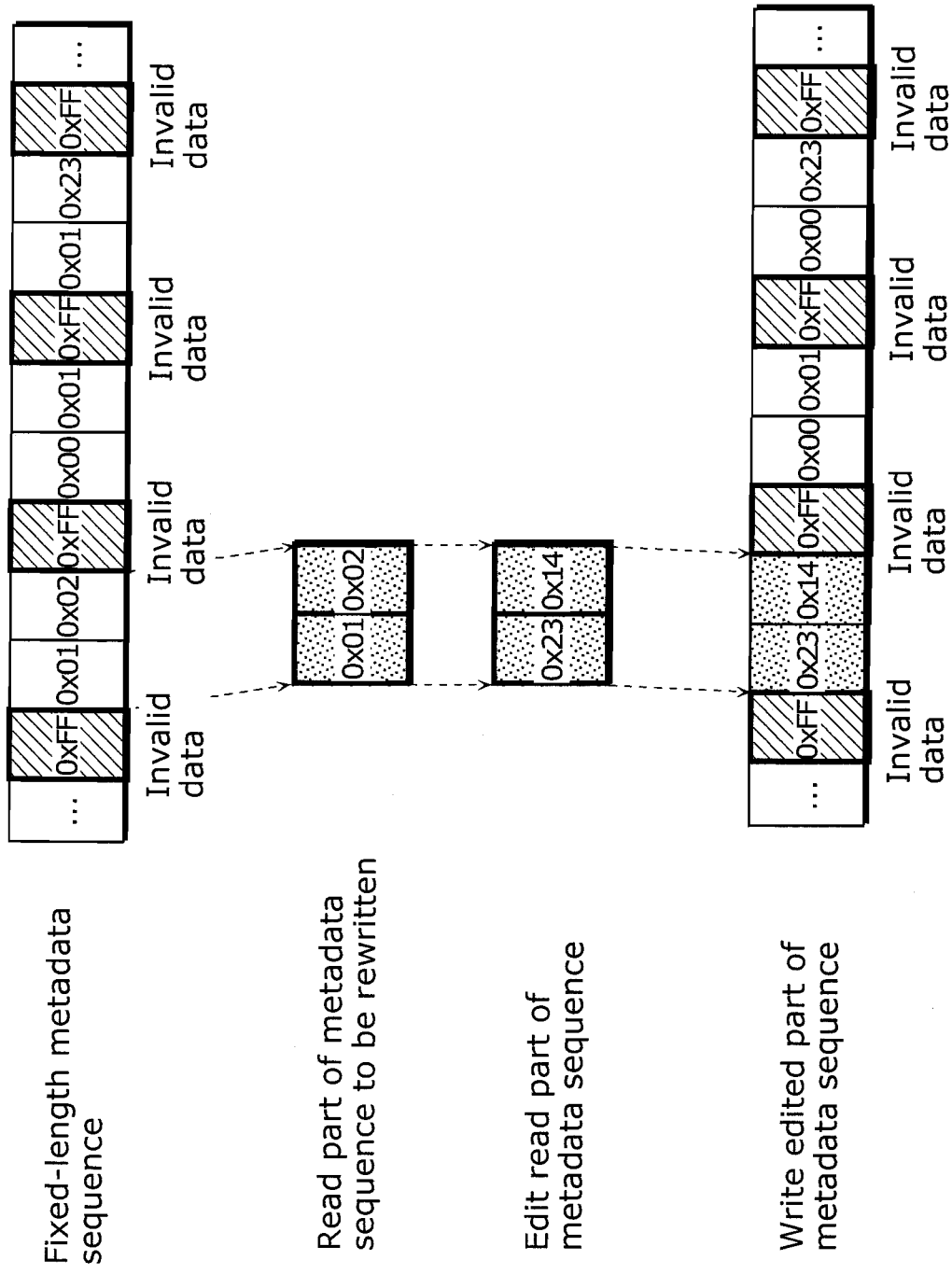
FIG. 9 is a diagram illustrating a metadata editing method according to an embodiment 3.

FIG. 9 is a diagram illustrating a metadata editing method according to the embodiment 3.

As illustrated in the figure, as with the embodiment 2, the metadata editing method according to the embodiment 3 is characterized by editing the metadata that is the data having the fixed-length. For example, after only a to-be-rewritten part of a metadata sequence to be edited among fixed-length metadata sequences is read and only the read part of the metadata sequence is edited, only the edited part of the metadata sequence is written into the to-be-rewritten part of the metadata sequence to be edited. In this manner, the metadata sequence is still the fixed-length data before and after the editing, and, no matter how many times the editing is performed, data located at corresponding positions in the fixed-length metadata sequence are guaranteed to be held at the same corresponding positions. Accordingly, it becomes possible to update only data at fixed positions.

The following will describe the present invention in detail.

Figure 10:
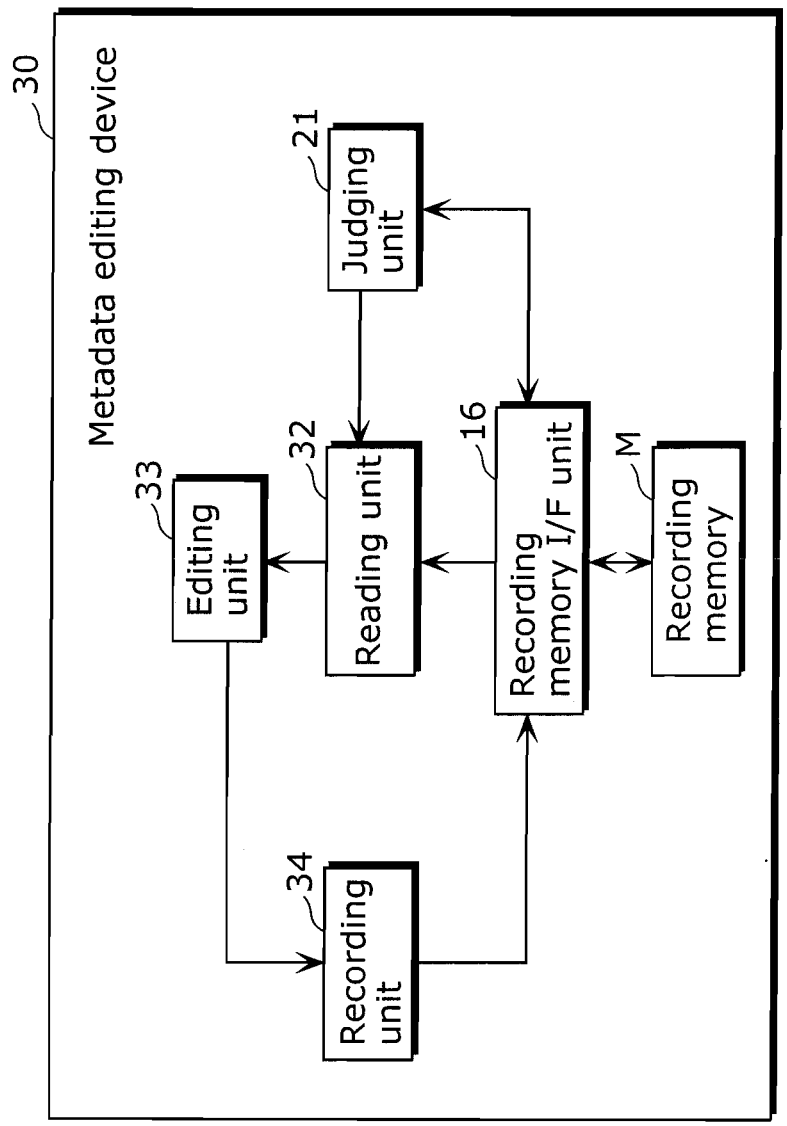
FIG. 10 is a schematic functional block diagram of a metadata editing device according to the present invention.

FIG. 10 is a schematic functional block diagram of a metadata editing device 30 according to the present invention.

As illustrated in the figure, the metadata editing device 30 includes the recording memory I/F unit 16, the judging unit 21, a reading unit 32, an editing unit 33, a recording unit 34, and the recording memory M. It is to be noted that identical elements are represented by the same reference numerals as in FIGS. 4 and 7, the detailed description of the elements is omitted.

In contrast to the metadata editing device 20 according to the embodiment 2, the metadata editing device 30 shown in FIG. 10 differs in that the insertion unit 12, the discarding unit 14, and the storage unit 22 are removed, and the reading unit 15, the editing unit 23, and the recording unit 13 are replaced by the reading unit 32, the editing unit 33, and the recording unit 34. The reading unit 32 reads only a to-be-rewritten part of a metadata sequence to be edited. The editing unit 33 edits only the to-be-rewritten part of the metadata sequence which has been read by the reading unit 32. The recording unit 34 writes, into the to-be-rewritten part of the metadata sequence, only the part of the metadata sequence which has been edited by the editing unit 33.

Figure 11:
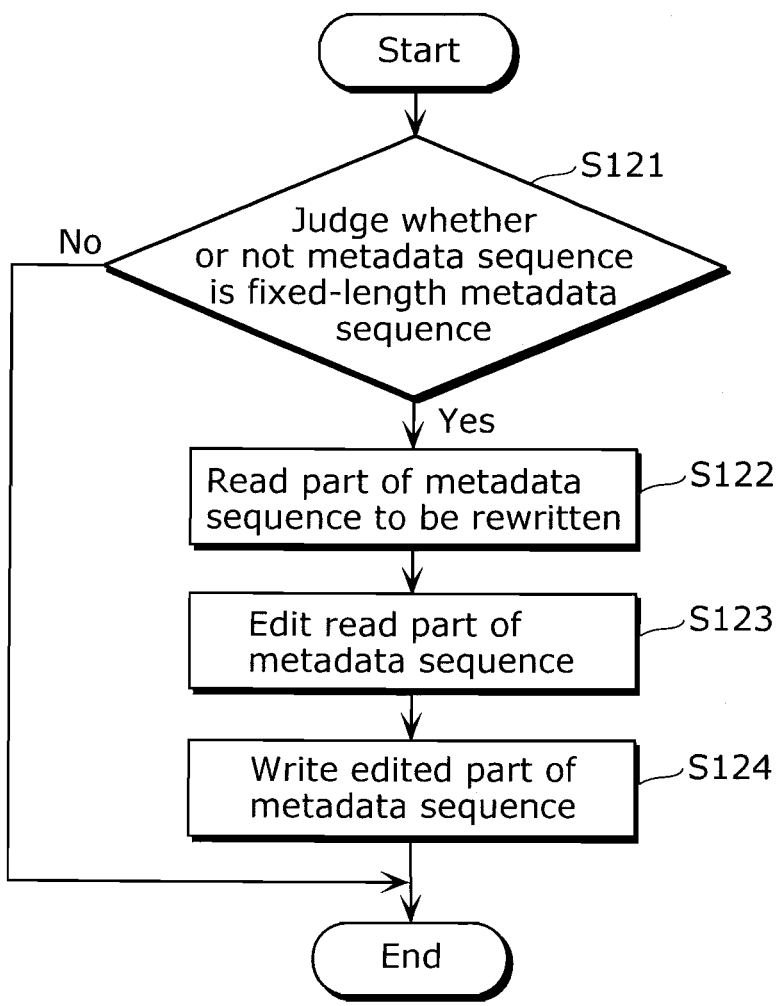
FIG. 11 is a diagram illustrating a procedure for editing metadata according to the embodiment 3.

FIG. 11 is a diagram illustrating a procedure for editing metadata according to the embodiment 3.

First, the judging unit 21 judges whether or not metadata to be edited is a fixed-length metadata sequence (S121). In the case where the metadata to be edited is the fixed-length metadata sequence (Yes in S121), the reading unit 32 reads only a to-be-rewritten part of the metadata sequence to be edited (S122), and transmits the read to-be-rewritten part of the metadata sequence to be edited to the editing unit 33. Next, the editing unit 33 edits only the to-be-rewritten part of the metadata sequence which has been read by the reading unit 32 (S123). The recording unit 34 rewrites, into the to-be-rewritten part of the metadata sequence to be edited, only the part of the metadata sequence which has been edited by the editing unit 33 (S124).

As described above, according to the embodiment 3, no matter how many times the editing is performed, the metadata sequence is still the fixed-length data, and data located at corresponding positions in the fixed-length metadata sequence are guaranteed to be held at the same corresponding positions. Consequently, it becomes possible to update only data at fixed positions.

(Embodiment 4)

A method for preventing start code emulation and causing a byte stream to be a fixed-length byte stream in the case of multiplexing a DV pack with a H.264 byte stream will be described in an embodiment 4. The DV pack is metadata in a digital video (DV) format that is a compression standard for digital video.

Figure 12:
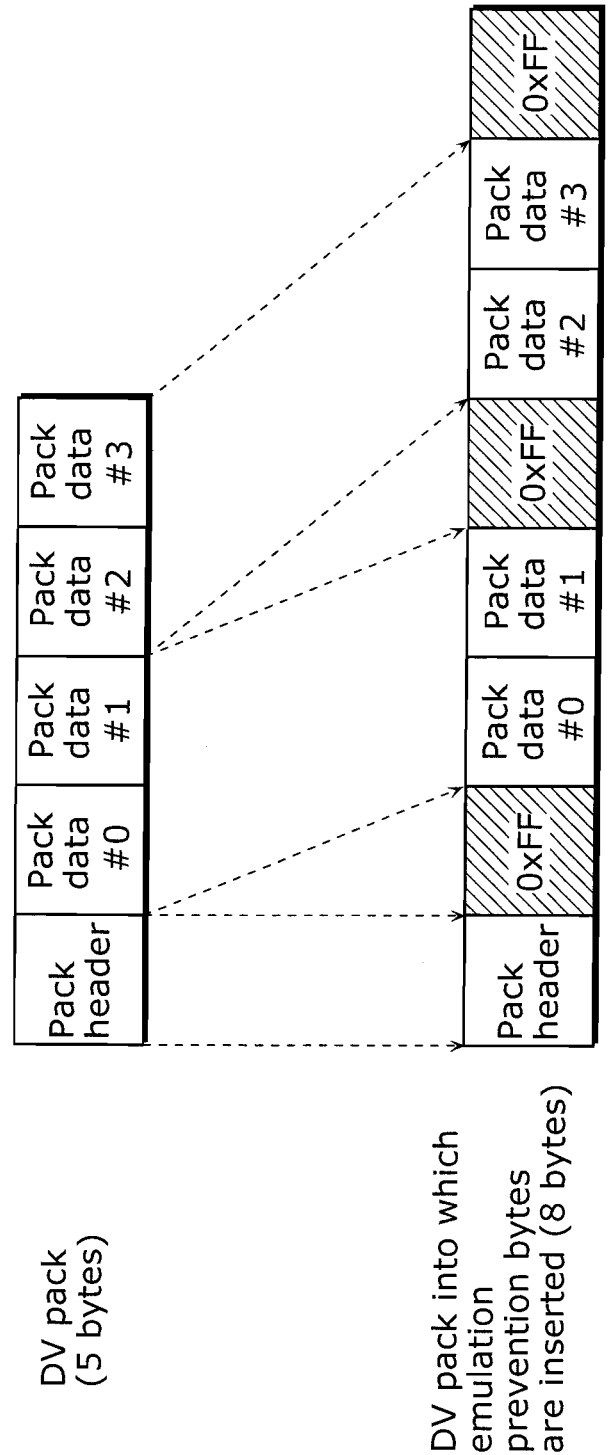
FIG. 12 is a diagram illustrating a metadata recording method according to an embodiment 4.

FIG. 12 is a diagram illustrating a metadata recording method according to the embodiment 4.

As illustrated in this figure, a DV pack consists of five bytes. Because the DV pack includes different categories of data, a pack header having one byte is provided to identify data categories. That is to say, among the five bytes consisting the DV pack, a start one byte is the pack header indicating a category of the DV pack, and a subsequent pack data having four bytes is metadata itself.

Figure 13:
FIG. 13 is a diagram illustrating a case in which the metadata in the embodiment 4 indicates time code information.

FIG. 13 is a diagram illustrating a case in which metadata indicates time code information in the embodiment 4.

As illustrated in the figure, when the metadata indicates the time code information, the pack header is 0x13. The time code information denotes a time of video data, shows each of four fields HH:MM:SS:FF with one byte, and stores a total of four bytes in pack data #0 to #3. Here, HH denotes hour, MM minute, SS second, and FF frame number. For instance, zero hour, zero minute, one second, zero frame is represented as 00:00:01:00, and pack data is 0x00000100. A time code is a count value that is counted up for each frame every time one frame is advanced. Because a specific byte sequence in binary data according to the H.264 is one of 0x000000, 0x000001, 0x000002, or 0x000003, a byte pattern of four-byte data of the time code tends to be identical with a byte pattern of the specific byte sequence. In addition, the video data is frequently edited by the editing device 2. In this case, the time code information is also frequently edited. That is to say, the time code information is a representative example of metadata on which partial rewriting is highly likely to be performed. Accordingly, in the case where metadata is a DV pack, a recording method according to syntax of the DV pack is employed in the embodiment 4.

Figure 14:
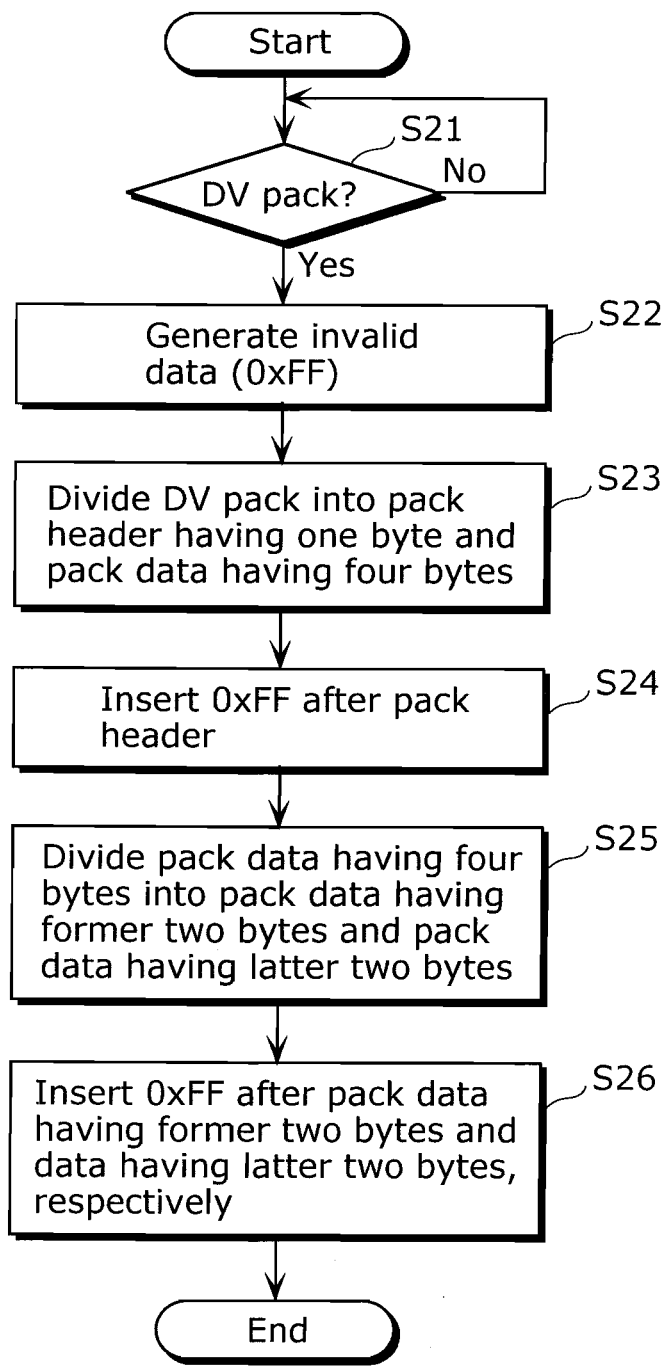
FIG. 14 is a diagram illustrating a procedure for recoding metadata according to the embodiment 4.

FIG. 14 is a diagram illustrating a procedure for recording metadata according to the embodiment 4.

First, in the case where metadata is a DV pack (Yes in S21), the generation unit 11 generates invalid data 0xFF (S22), and transmits the generated 0xFF to the insertion unit 12. The insertion unit 12 separates a start pack header having one byte and subsequent pack data having four bytes (S23), and inserts an invalid byte 0xFF after the pack header (S24). Next, the insertion unit 12 divides the pack data having four bytes into the former two bytes and the latter two bytes (S25), and inserts another invalid byte 0xFF after the former two bytes (S26). Further, the insertion unit 12 inserts yet another invalid byte 0xFF after the latter two bytes (S26), so as to prevent start code emulation from occurring even in the case where DV packs are successively recorded.

As stated above, according to the embodiment 4, the DV pack having five bytes is converted into fixed-length data having eight bytes. As a result, no matter what a value the contents of a DV pack have, the start code emulation will not occur. Further, because a data length after the conversion is a fixed length, it becomes easy to rewrite data partially. For instance, even in the case where DV packs are successively recorded, because the update unit 17 of the editing device 2 can calculate a position at which a target DV pack are recorded, the update unit 17 can easily rewrite data partially.

As described above, according to the embodiment 4, in the case where the metadata includes header byte sequences and data byte sequences, the data length after the anti-emulation is performed (after the conversion) can be the fixed length by inserting the invalid data after a header byte sequence, inserting another invalid data into a data byte sequence that follows the header byte sequence at the intervals shorter than the length of the specific byte sequence, and inserting yet another invalid data between the data byte sequence and another header byte sequence that follows the data byte sequence, the header byte sequences each denoting a header in which a data content of the metadata is described and having a length shorter than the length of the specific byte sequence, the data byte sequences each being a data portion of the metadata and having a length longer than the length of the specific byte sequence. That is to say, inserting each of pieces of invalid data into the metadata at intervals allows the metadata to be the fixed-length data, the intervals being uneven in accordance with a meaning of a byte sequence of the metadata and being shorter than the length of the specific byte sequence.

Accordingly, no matter how many times the rewriting is performed, because data located at corresponding positions in the fixed-length metadata sequence are guaranteed to be held at the same corresponding positions, it becomes possible to update only data at fixed positions.

It is to be noted that although the 0xFF is exemplified as the invalid byte in the embodiment 4, the present invention is not limited to this. That is to say, the invalid data may be a value not included in the specific byte sequence, and is not limited to the 0xFF.

Furthermore, although the example where the invalid data is inserted into each byte sequence at the uneven intervals of 1 to 2 to 2 has been described in the embodiment 4, the intervals are not limited to this as long as uneven intervals are in accordance with a meaning of a byte sequence of metadata.

Moreover, although the example where the metadata indicates the time code information has been described in the embodiment 4, the present invention is not limited to this. For example, the same is applied to time information, a date, a time, and information about format.

It is to be noted that though not mentioned above, at the time of reproduction, when the reading unit 15 separates metadata from binary data at the time of reading the metadata from the recording memory M, the discarding unit 14 is designed to discard the invalid data 0xFF in the read metadata.

It is to be noted that although the metadata is divided after the pieces of invalid data are generated in FIG. 14 (S21 to S22), the order of the steps S11 and S12 may be reverse. The same is true for a relationship between the step S25 in which the metadata is divided and the step S21. In addition, although there are two steps S24 and S26 in which the invalid data OFF is inserted into the metadata in FIG. 14, the order of the steps S24 and S26 may be reverse. Put it differently, as long as the data conversion shown in FIG. 12 is performed, the steps S24 and S26 belong to the technical scope of the present invention regardless of the order in which either step is performed.

Furthermore, not only the metadata recording device mentioned above but also a data medium onto which metadata that is data having a fixed length recorded by the metadata recording device according to the present invention is written belong to the technical scope of the present invention. In other words, the data medium onto which metadata into which each of pieces of invalid data is inserted at intervals shorter than a length of a specific byte sequence belongs to the scope of the present invention, the data medium being for recording main data and metadata, which are binary data, the invalid data being data of a value not included in the specific byte sequence, the specific byte sequence being a byte sequence having a special meaning.

Industrial Applicability

The present invention can be applied to camera recorders in which an invalid byte for anti-emulation needs to be inserted into metadata or the like.

The invention claimed is:

1. A metadata recording device that records main data and metadata, the main data and the metadata being binary data, comprising:
   a generation unit configured to generate pieces of invalid data, each of the pieces of invalid data (i) including an invalid byte sequence having at least one byte and (ii) being data of a value not included in a specific byte sequence that is a byte sequence indicating a partition in the binary data;
   an insertion unit configured to insert each piece of the invalid data into the entirety of the metadata at intervals shorter than a length of the specific byte sequence; and
   a recording unit configured to record the metadata into which the pieces of the invalid data are inserted.

2. The metadata recording device according to claim 1, wherein said insertion unit is configured to insert each piece of the invalid data into the entirety of the metadata at the intervals to change the metadata so that the metadata does not include the specific byte sequence, the insertion causing the metadata to be data having a fixed length.

3. The metadata recording device according to claim 1, wherein said insertion unit is configured to insert each piece of the invalid data into the entirety of the metadata at the intervals to change the metadata so that the metadata does not include the specific byte sequence, the insertion causing the metadata to be data having a fixed length, and
   wherein the intervals are uneven.

4. The metadata recording device according to claim 3, wherein, in a case where the metadata includes header byte sequences and data byte sequences, said insertion unit is configured to insert each piece of the invalid data into the entirety of the metadata at the intervals by (i) inserting a first piece of the invalid data after a header byte sequence, (ii) inserting a second piece of the invalid data into a data byte sequence that follows the header byte sequence at the intervals shorter than the length of the specific byte sequence, and (iii) inserting a third piece of the invalid data between the data byte sequence and another header byte sequence that follows the data byte sequence,
   wherein the header byte sequences each indicate a header in which a data content of the metadata is described and have a length shorter than the length of the specific byte sequence, and
   wherein the data byte sequences each are a data portion of the metadata and have a length longer than the length of the specific byte sequence.

5. The metadata recording device according to claim 2, wherein, in a case where the binary data is compressed data in compliance with the H.264 standard, where the specific byte sequence is a byte sequence 0x000000, 0x000001, 0x000002, or 0x000003 that has three bytes and represents a start code in the H.264 standard, and where supplemental enhancement information (SEI) in the H.264 standard is multiplexed with the metadata, said generation unit is configured to generate the pieces of the invalid data so that each of the pieces of the invalid data is one byte, and
   wherein said insertion unit is configured to insert, into the entirety of the metadata, each piece of the invalid data having one byte for every two bytes in the metadata.

6. The metadata recording device according to claim 4, wherein, in a case where the metadata is a digital video (DV) pack having five bytes in a DV format, said generation unit is configured to generate the pieces of the invalid data so that each of the pieces of the invalid data is one byte, and
   wherein said insertion unit is configured to insert one of the pieces of the invalid data having one byte after a start one byte, and insert another piece of the invalid data having one byte after a first two bytes and a last two bytes of pack data having four bytes, the insertion causing the metadata to be data having a fixed length of a total of eight bytes,
   wherein the start one byte is a header byte sequence and represents a pack header of the DV pack, and
   wherein the pack data is a data byte sequence and follows the pack header.

7. The metadata recording device according to claim 6, further comprising
   an update unit configured, in a case where the DV pack indicates time code information, to update the time code information without decoding the binary data by using a fixed position of the time code information in the binary data.

8. The metadata recording device according to claim 1, further comprising:
   a reading unit configured to read the recorded metadata; and
   a discarding unit configured to discard the pieces of the invalid data in the read metadata.

9. A metadata editing device that edits metadata recorded by the metadata recording device of claim 1, said metadata editing device comprising:
   a judging unit configured to judge whether or not the metadata is fixed-length data that is metadata into which pieces of invalid data are inserted at intervals shorter than a length of a specific byte sequence, each of the pieces of the invalid data (i) including an invalid byte sequence having at least one byte and (ii) being data of a value not included in the specific byte sequence that is a byte sequence indicating a partition in binary data;

a discarding unit configured, in a case where said judging unit judges that the metadata is the fixed-length data, to read the fixed-length data and to discard all pieces of the invalid data that are included in the fixed-length data and located at interval positions;

a storage unit configured to store at least one of the pieces of the invalid data to be discarded by said discarding unit;

an insertion unit configured to edit the fixed-length data from which the pieces of the invalid data are discarded and to insert any one of the pieces of the invalid data stored in said storage unit into the edited data at the intervals; and a recording unit configured to edit the metadata by recording the data into which the pieces of the invalid data are inserted.

10. A metadata editing device that edits metadata into which the pieces of the invalid data are inserted by the metadata recording device of claim 1, said metadata editing device comprising:

a judging unit configured to judge whether or not the metadata is fixed-length data that is the metadata into which each piece of the invalid data is inserted at intervals shorter than a length of a specific byte sequence, the invalid data (i) including an invalid byte sequence having at least one byte and (ii) being data of a value not included in the specific byte sequence that is a byte sequence indicating a partition in binary data;

a reading unit configured to read data to be edited from a fixed position between two of the pieces of the invalid data, in a case where said judging unit judges that the metadata is the fixed-length data; and an editing unit configured to edit the data to be edited, and edit the metadata by writing the edited data into the fixed position.

11. A metadata recording method for recording main data and metadata, the main data and the metadata being binary data, comprising:

a step of generating pieces of invalid data, each of the pieces of invalid data (i) including an invalid byte sequence having at least one byte and (ii) being data of a value not included in a specific byte sequence that is a byte sequence indicating a partition in the binary data;

a step of inserting each piece of the invalid data into the entirety of the metadata at intervals shorter than a length of the specific byte sequence; and a step of recording the metadata into which the pieces of the invalid data are inserted.

12. A non-transitory data medium having stored thereon a program for recording main data and metadata, the main data and the metadata being binary data, wherein, when executed, said program causes a computer to execute a method comprising:

a step of generating pieces of invalid data, each of the pieces of invalid data (i) including an invalid byte sequence having at least one byte and (ii) being data of a value not included in a specific byte sequence that is a byte sequence indicating a partition in the binary data;

a step of inserting each piece of the invalid data into the entirety of the metadata at intervals shorter than a length of the specific byte sequence; and a step of recording the metadata into which the pieces of the invalid data are inserted.

* * * * *